United States Patent
Ina

(10) Patent No.: US 11,211,981 B2
(45) Date of Patent: Dec. 28, 2021

(54) CONTROL APPARATUS, METHOD OF CONTROLLING THE SAME, AND COMMUNICATION SYSTEM

(71) Applicant: CANON KABUSHIKI KAISHA, Tokyo (JP)

(72) Inventor: Eigoro Ina, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 23 days.

(21) Appl. No.: 16/829,069

(22) Filed: Mar. 25, 2020

(65) Prior Publication Data
US 2020/0343952 A1    Oct. 29, 2020

(30) Foreign Application Priority Data

Apr. 24, 2019   (JP) .............................. JP2019-083215

(51) Int. Cl.
*H04B 7/06*      (2006.01)
*H04B 17/318*    (2015.01)

(52) U.S. Cl.
CPC ......... *H04B 7/0617* (2013.01); *H04B 17/318* (2015.01)

(58) Field of Classification Search
CPC ..... H04B 7/0617; H04B 17/318; H04B 7/024
USPC ........................................... 375/252; 370/252
See application file for complete search history.

(56) References Cited

U.S. PATENT DOCUMENTS

| | | | |
|---|---|---|---|
| 2018/0084584 A1 | 3/2018 | Umehara | |
| 2020/0007283 A1* | 1/2020 | Chen et al. | ........... H04L 5/0035 |

FOREIGN PATENT DOCUMENTS

JP          2018-050133 A        3/2018

* cited by examiner

*Primary Examiner* — Fitwi Y Hailegiorgis
(74) *Attorney, Agent, or Firm* — Venable LLP

(57) ABSTRACT

A control apparatus operable to control a plurality of access points (APs) configured to be able to use joint beamforming (JB) includes a memory containing instructions, and at least one processor for executing the instructions. The executed instructions cause the control apparatus to obtain, from a station (STA) which is a communication partner, reception information on a received signal strength at the STA of signals transmitted from the plurality of Aps, and determine, based on the reception information, a communication parameter related to JB for communication with the STA. It is determined to use JB for communication with the STA in a case where there is one or more other received signal strengths for which a strength difference from a largest received signal strength among a plurality of received signal strengths of the plurality of APs included in the reception information is within a predetermined range.

11 Claims, 3 Drawing Sheets

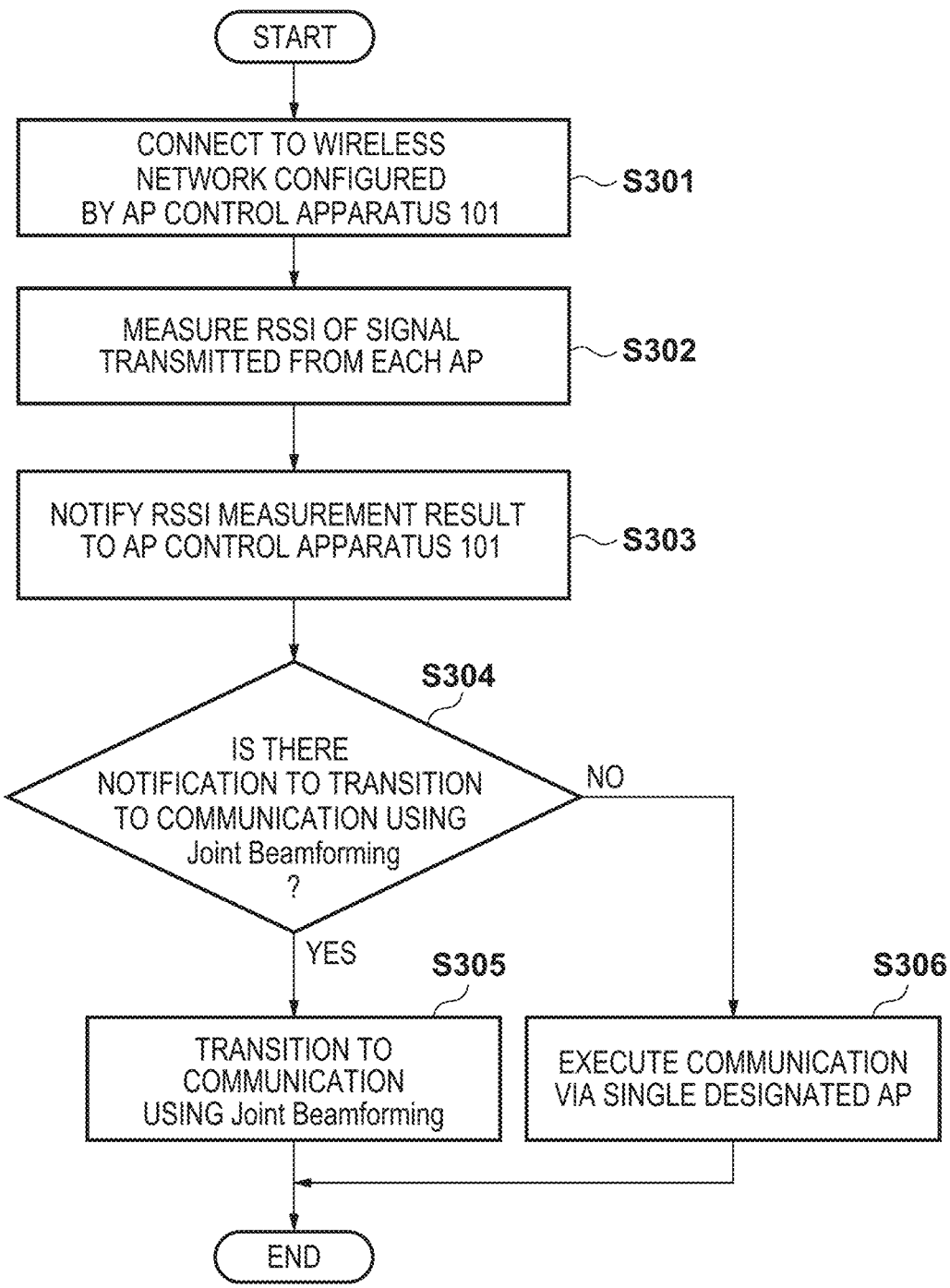

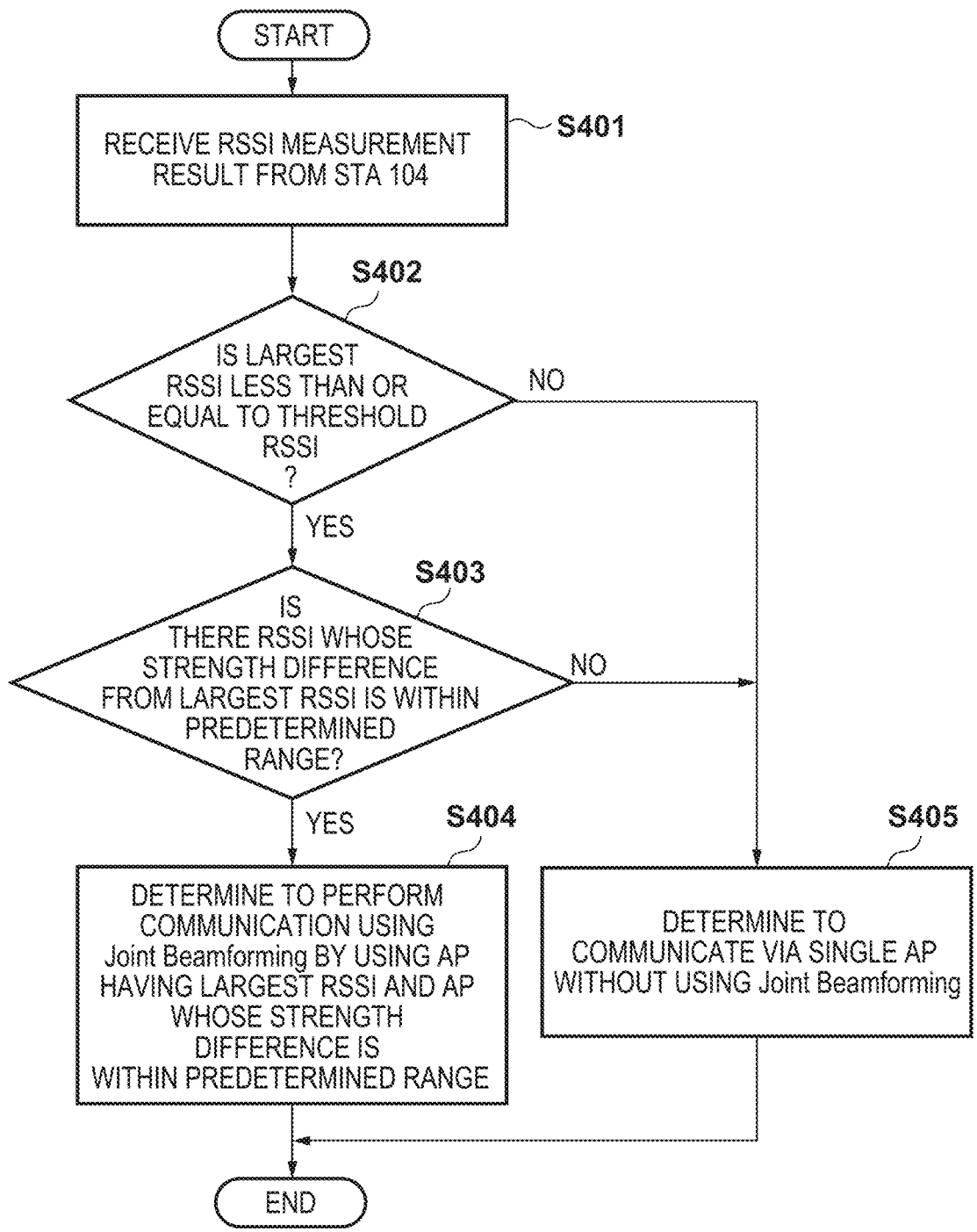

CONTROL APPARATUS, METHOD OF CONTROLLING THE SAME, AND COMMUNICATION SYSTEM

BACKGROUND OF THE INVENTION

Field of the Invention

The present invention relates to control of communication that uses joint beamforming.

Description of the Related Art

As communication standards for a wireless local area network (WLAN), standards of the IEEE 802.11 series are known. US-2018-0084584 proposes a technique for making it possible to secure high frequency utilization efficiency while suppressing interference in communication using IEEE 802.11ax.

To further improve throughput, an Extreme High Throughput (EHT) Study Group (SG) was established in IEEE in 2018. In the EHT SG, a technique called Joint Beamforming (JB) has been proposed. JB is a technique aimed at improving the reachable distance of signals by causing collaborative operation of a plurality of Access Points (AP). Specifically, the same data is transmitted on the same frequency channel at the same time while adjusting the phase with respect to the same Station (STA).

Incidentally, in general, when a plurality of APs are placed at different positions, reception intensity of radio waves arriving from respective APs observed at a certain STA are different from each other. There is a problem that, when only the reception intensity of a radio wave that arrives from a certain AP is relatively large, improvement of the reachable distance by using JB cannot be expected, while resources of the entire system are wastefully consumed.

SUMMARY OF THE INVENTION

According to one aspect of the present invention, a control apparatus operable to control a plurality of access points (APs) configured to be able to use joint beamforming (JB), comprises: an obtaining unit configured to obtain, from a station (STA) which is a communication partner, reception information on a received signal strength at the STA of signals transmitted from the plurality of APs; and a determining unit configured to determine, based on the reception information, a communication parameter related to JB for communication with the STA.

The present invention enables efficient use of joint beamforming (JB).

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a flowchart of an operation in an STA.

FIG. 4 is a flowchart of an operation in an AP control apparatus.

DESCRIPTION OF THE EMBODIMENTS

Figure 1:
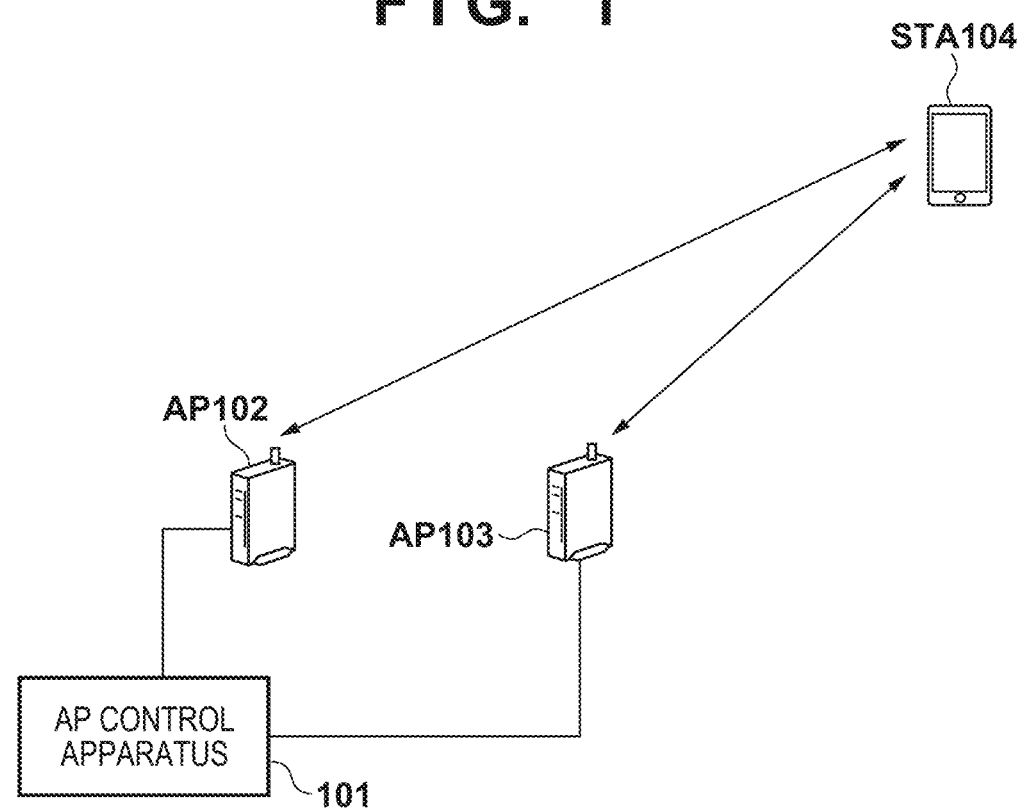
FIG. 1 is a diagram illustrating an overall configuration of a wireless network system.

Hereinafter, embodiments will be described in detail with reference to the attached drawings. Note, the following embodiments are not intended to limit the scope of the claimed invention. Multiple features are described in the embodiments, but limitation is not made of an invention that requires all such features, and multiple such features may be combined as appropriate. Furthermore, in the attached drawings, the same reference numerals are given to the same or similar configurations, and redundant description thereof is omitted.

First Embodiment

As a first embodiment of the control apparatus according to the present invention, a communication system configured to be able to use Joint Beamforming (JB) will be exemplified and described below.

<System Configuration and Apparatus Configuration>

FIG. 1 is a diagram illustrating an overall configuration of a wireless network system that includes an AP control apparatus 101 which is a control apparatus according to the first embodiment. An STA 104 is a communication apparatus having a role as a station (STA) that participates in a wireless network. The APs 102 and 103 are communication apparatuses that each have a role as an access point (AP) that builds a wireless network. Although FIG. 1 exemplarily illustrates a wireless network configured by two APs and one STA, the number of APs and STAs is not limited to this.

Each communication apparatus supports communication that uses joint beamforming (hereinafter simply referred to as JB), and can execute communication via a wireless network. Each communication apparatus can communicate in frequency bands of the 2.4 GHz band, the 5 GHz band, and the 6 GHz band. Also, each communication apparatus can communicate using bandwidths of 20 MHz, 40 MHz, 80 MHz, 160 MHz, and 320 MHz.

By executing OFDMA communication, each communication apparatus can realize multi-user (MU) communication in which signals of a plurality of users are multiplexed. In OFDMA communication, a part of a divided frequency band (RU: Resource Unit) is allocated to each STA so they do not overlap with each other, and the carriers of each STA are orthogonalized. Therefore, the AP can communicate with a plurality of STAs in parallel.

As described above, each communication apparatus is configured to be able to use JB. That is, the two APs 102 and 103 can perform collaborative operation to communicate with the STA 104. The AP control apparatus 101 controls the APs 102 and 103 and performs communication control using JB, as described later. FIG. 1 illustrates an example in which the APs 102 and 103 are communicatively connected to the AP control apparatus 101 via a backhaul line so that the APs 102 and 103 can communicate with each other for collaborative operation. However, the function of the AP control apparatus may be configured to be incorporated into any one AP of a plurality of APs.

It is sufficient if each communication apparatus is compliant with a standard of the IEEE 802.11 series (802.11a/b/g/n/ac/ax/be). In addition to a standard of the IEEE 802.11 series, other communication standards such as Bluetooth (registered trademark), NFC, UWB, ZigBee, and MBOA may be supported. Here, NFC is an abbreviation of Near Field Communication, UWB is an abbreviation for Ultra Wide Band, and MBOA is an abbreviation for Multi Band OFDM Alliance. UWB include wireless USB, wireless 1394, WiNET, or the like. Further, configuration may be taken to support a communication standard of a wired communication such as a wired LAN.

Specific examples of the APs 102 and 103 include, but are not limited to, wireless LAN routers or PCs. The APs 102 and 103 may each be a wireless chip or the like that is capable of executing wireless communication based on the wireless LAN standard.

A specific example of the STA 104 includes, but is not limited to, a camera, a tablet, a smart phone, a PC, a mobile phone, a video camera, or the like. In addition, the STA 104 may be a wireless chip or the like that is capable of executing wireless communication based on the wireless LAN standard.

Figure 2:
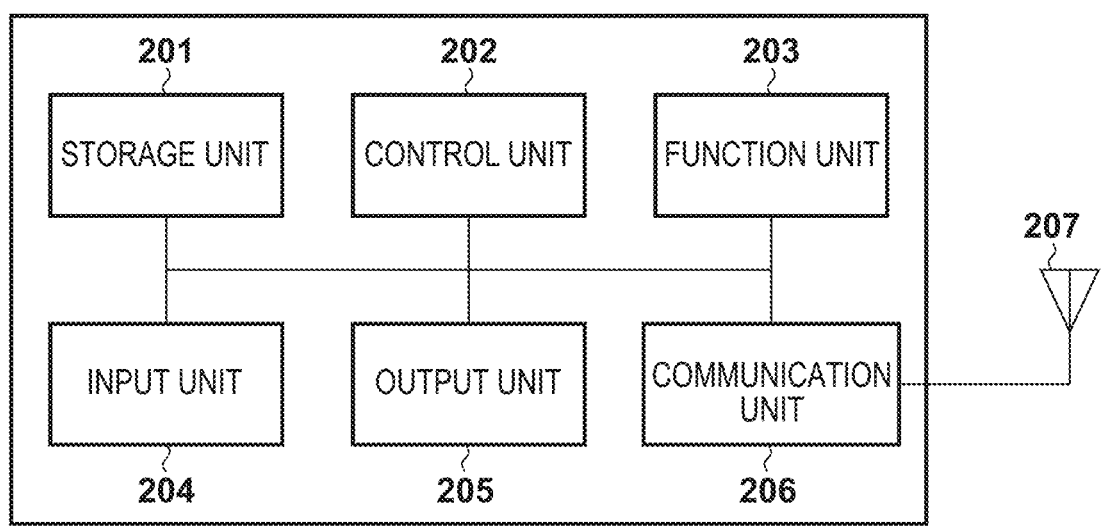
FIG. 2 is a diagram illustrating a hardware configuration of each apparatus.

FIG. 2 is a diagram illustrating a hardware configuration of each apparatus. That is, a hardware configuration of the AP control apparatus 101, the APs 102 and 103, and the STA 104 is exemplarily illustrated. Each apparatus includes a storage unit 201, a control unit 202, a function unit 203, an input unit 204, an output unit 205, a communication unit 206, and an antenna 207. Configuration may be taken such that the AP control apparatus 101 has only the communication unit 206 for wired communication and does not have the antenna 207. Further, the APs 102 and 103 may each be configured to have a communication unit 206 corresponding to both wired communication and wireless communication.

The storage unit 201 is configured by a memory such as a ROM or a RAM, and stores various information such as a computer program for performing various operations to be described later, communication parameters for wireless communication, and the like. ROM is an abbreviation of Read Only Memory and RAM is an abbreviation of Random Access Memory. As the storage unit 201, a storage medium such as a flexible disk, a hard disk, an optical disk (CD, DVD, or the like), a magneto-optical disk, a magnetic tape, or a nonvolatile memory card may be used in addition to a memory such as a ROM or a RAM. The storage unit 201 may be configured by a plurality of memories.

The control unit 202 is configured by one or more processors such as a CPU and an MPU, for example, and controls the entire apparatus by executing a computer program stored in the storage unit 201. CPU is an abbreviation of Central Processing Unit, and MPU is an abbreviation of Micro Processing Unit. The control unit 202 may control the entire apparatus in cooperation with computer programs stored in the storage unit 201 and the OS (Operating System). In addition, the control unit 202 generates data and signals to be transmitted in communication with other apparatuses. In addition, the control unit 202 may include a plurality of processors such as with multi-cores, and the entire apparatus may be controlled by the plurality of processors.

The function unit 203 is hardware for the apparatus to execute predetermined processing. The function unit 203 realizes a function unique to each apparatus through control in accordance with the control unit 202. For example, the STA 104 executes processing such as imaging, printing, and projecting in addition to radio communication. In addition, the APs 102 and 103 execute processing for transferring the received data and setting processing for communication, which is described later. The AP control apparatus 101 executes a process related to setting for communication for the APs 102 and 103.

The input unit 204 receives various operations from a user. The output unit 205 performs various outputs with respect to the user via a monitor screen or a speaker. Here, the output by the output unit 205 may be displayed on a monitor screen, an audio output by a speaker, a vibration output, or the like. It should be noted that both the input unit 204 and the output unit 205 may be realized by one module as in a touch panel. The input unit 204 and the output unit 205 may be integrated together or be apparatuses that are separate from each other.

The communication unit 206 performs communication with other devices. The data to be communicated includes user data (image data, document data, video data, or the like) and control data (data related to communication settings). As described above, the AP control apparatus 101 may be configured to include only the communication unit 206 for wired communication. Further, the APs 102 and 103 may each be configured to have a communication unit 206 that supports both wired communication and wireless communication. The communication unit 206 which is for wireless communication controls the antenna 207 to transmit and receive a wireless signal for wireless communication generated by the control unit 202. Note that, in addition to a wireless LAN standard, when an NFC standard, a Bluetooth standard, or the like is supported by the apparatus, the apparatus may control wireless communication based on these communication standards. In addition, configuration may be such that, in the case where wireless communication conforming to a plurality of communication standards can be executed, the apparatus has separate communication units 206 and antennas 207 which conform to respective communication standards.

In the present embodiment, it is assumed that the STA 104 is configured to be able to connect to a wireless network configured by one or both of the AP 102 and the AP 103. It is assumed that, when the STA 104 is connected to a plurality of APs, the AP control apparatus 101 controls the respective APs to perform operation for JB.

<Issues for Communication Using JB>

JB is a technique aimed at improving a reachable distance of a signal by allowing a plurality of access points (APs) to transmit the same data on the same frequency channel at the same time while adjusting the phase with respect to the same station (STA). Each of the plurality of APs can transmit using a maximum transmission output which is regulated by radio wave regulations of each country. Therefore, by a plurality of APs transmitting after performing collaborative operation (adjusting phases), the radiation intensity in a specific direction can be made larger than that which can be output by a single AP. For example, when the two APs operate in cooperation with each other, an improvement in radio wave intensity of about a maximum of 6 dB is expected under an ideal situation, and the reachable distance is expected to approximately double. However, depending on the positional relationship between the plurality of APs and the STA, there are cases where JB cannot be effectively used and the reachable distance cannot be extended.

For example, in order to actually improve the signal strength by about 6 dB, it is necessary for the signals of the respective APs to reach the STA to be communicated with at the same strength. If the signal strengths from the respective APs differ by 10 dB, the improvement of the signal strength in accordance with JB can be expected to be only about 1 dB. Although a method of decreasing the signal strength of the AP on a side where a signal strength is stronger to align the signal strengths is also conceivable, the effect is limited as compared with a case where the AP on the side where the signal strength is stronger transmits a signal to the STA alone. Therefore, when the signal strengths from the respective APs are greatly different from each other, it is considered that it is more efficient to not perform JB from the viewpoint of resource consumption.

Further, when the STA is close to any of the APs and is at a position where a signal to noise ratio (SNR) can be sufficiently ensured, a maximum effective communication rate can be realized without using JB. In such a case, it is also better to not to perform JB.

An exemplary situation in which the use of JB is effective is when the APs 102 and 103 are relatively close to each other, and in contrast to this the STA 104 is far apart from the APs 102 and 103. Since the STA 104 is distant from both APs, an adequate effective communication rate cannot be ensured. On the other hand, since the difference between the distance from the STA 104 to the AP 102 and the distance from the STA 104 to the AP 103 is relatively small, strengths of signals from each AP are substantially equal at the STA 104.

<Operation of the Apparatus>

Next, the operation for a communication connection in the present embodiment will be described with reference to FIGS. 3 and 4. FIG. 3 is a flowchart of operation in the STA 104, and FIG. 4 is a flowchart of operation in the AP control apparatus 101.

In step S301, the STA 104 connects to a wireless network configured by the AP control apparatus 101. More specifically, it connects to a wireless network formed by the AP 102 or the AP 103. Here, description is given assuming that the STA 104 establishes a connection with one AP (the AP 102). As a result, the STA 104 enters a state in which communication with the AP control apparatus 101 via the AP 102 becomes possible.

In step S302, the STA 104 periodically measures a received signal strength indicator (RSSI) as reception information of a signal from the AP 102 and the AP 103. For example, the RSSI of beacon signals transmitted from the AP 102 and the AP 103 is measured. Here, it is assumed that the RSSI of signals from one or more connectable APs (here the AP 102 and the AP 103) is measured, but the RSSI of signals from other APs may be further measured.

In step S303, the STA 104 notifies the AP control apparatus 101 of the measured result of RSSI. For example, the STA 104 performs a notification when it detects that the beacon transmitted from the AP 102 includes information indicating that the AP 102 can use JB. Configuration may be taken such that the STA 104 transmits a measurement result (RSSI notification) to the address of the AP control apparatus 101 which has been notified to the STA 104 in advance. Alternatively, configuration may be taken such that the STA 104 transmits an RSSI notification to the AP 102 to which it is currently connected, and the AP 102 transfers the RSSI notification to the AP control apparatus 101.

In step S401, the AP control apparatus 101 receives and obtains, from the STA 104, the RSSI notification, which is reception information at the STA 104 which is the communication partner. That is, the RSSI notification transmitted from the STA 104 in step S303 is received via the AP 102 which is communicably connected to the STA 104 in advance. Note that a signal such as a beacon includes, as an IP address, information of a transmission source indicating which AP the signal is from. Thus, the STA 104 can know which AP the RSSI corresponds to. Here, when the STA 104 makes an RSSI notification to the AP control apparatus 101, it notifies the AP control apparatus 101 of which AP the RSSI is for.

In step S402, the AP control apparatus 101 determines the largest RSSI of the one or more RSSIs included in the received RSSI notification. Further, it is determined whether or not the determined largest RSSI is equal to or less than a predetermined threshold (hereinafter, a threshold RSSI) at which a predetermined communication rate can be realized. Here, it is assumed that the threshold RSSI is set in advance in the AP control apparatus 101. If the determined largest RSSI exceeds the threshold RSSI (step S402→No), the process proceeds to step S405, and if it is equal to or less than the threshold RSSI (step S402→Yes), the process proceeds to step S403.

In step S403, the AP control apparatus 101 determines whether or not another AP, for which a strength difference, with respect to the largest RSSI determined in step S402, is within a predetermined range, is present in the received RSSI notification. Here, it is assumed that the predetermined range is set in advance in the AP control apparatus 101. If there is another AP whose strength difference is less than or equal to the predetermined range (step S403→Yes), the process proceeds to step S404, and if there are no other AP whose strength difference is less than or equal to the predetermined range (step S403→No), the process proceeds to step S405.

In step S404, the AP control apparatus 101 determines that it is possible to expect improvement of a communication range or a communication speed, in accordance with JB. Therefore, the AP control apparatus 101 determines to use JB for communication with the STA 104, and controls the respective APs so as to perform communication via a plurality of APs (here, the AP 102 and the AP 103). Specifically, each AP is notified to perform JB in which a plurality of APs are used for which a strength difference of RSSIs is within a predetermined range.

In step S405, the AP control apparatus 101 determines that it is not possible to expect improvement of a communication range or a communication speed, in accordance with JB. Therefore, the AP control apparatus 101 determines not to use JB for communication with the STA 104, and notifies each AP so as to perform communication via one AP (here, the AP 102). That is, when the processing has proceeded from step S402 to step S405, it is possible to expect that a sufficient communication rate can be ensured without using JB, and further optimization of communication in accordance with JB is limited. Further, when the processing has proceeded from step S403 to step S405, optimizing communication in accordance with JB is limited by combinations of available APs.

In step S304, the STA 104 waits for a signal from the AP control apparatus 101 notifying transitioning to JB. If notified (Yes in step S304), the processing proceeds to step S305, and if not notified (No in step S304), the processing proceeds to step S306. Here, the case where the notification of the transition to JB is not given includes a case where a notification for independent communication is made.

In step S305, the STA 104 transitions to communication that uses JB. Specifically, the AP 102 and the AP 103 receive a transfer function that is estimated in the AP control apparatus 101 and start communication with the STA 104. It is necessary to obtain a transfer function between each AP and the STA 104 in order to implement JB. In order to obtain a transfer function, channel state information (CSI) between each AP and the STA 104 is required.

Therefore, the STA 104 transmits a sounding frame, which is a frame for calculating CSI, prior to performing JB. The AP 102 and the AP 103 can calculate CSI with the STA 104 by receiving the sounding frame. Alternatively, the AP 102 and the AP 103 transmit sounding frames. The STA 104 can calculate CSI with the AP 102 and the AP 103 by receiving the sounding frame.

When the CSI is calculated in the AP 102 and the AP 103, the AP 102 and the AP 103 notify their calculated CSI to the AP control apparatus 101. In contrast, when the CSI is calculated at the STA 104, the STA 104 notifies the calculated CSI to the AP control apparatus 101. As a result, the AP control apparatus 101 can estimate a transfer function between each AP (the AP 102 and the AP 103) and the STA 104, and the AP control apparatus 101 notifies each AP of the estimated transfer function. Each of the AP 102 and the AP 103 starts communication with the STA 104 using the notified transfer function. As a result, communication using JB is realized.

In step S306, the STA 104 communicates via one of the APs. Here, it is assumed that communication via the currently connected AP 102 is continued, but there may be a switch to communication via another AP that is designated by the AP control apparatus 101.

As described above, according to the present embodiment, the RSSI of the signals transmitted from the plurality of APs is measured by the STA, and parameters of JB communication are determined based on the results of RSSI measurements. With this configuration, more efficient communication can be realized. Specifically, when the effect of using JB is limited, the consumption of resources of the entire system can be suppressed by performing control so as to not use JB. Further, in the case of using JB, it is possible to clearly determine a combination of APs capable of maximizing an effect.

Although the present embodiment does not mention whether or not MIMO (Multiple-Input and Multiple-Output) is performed, similar effects can be obtained by performing a similar process as the present embodiment even when MIMO is performed. Both single-user (SU)-MIMO and multi-user (MU)-MIMO can be used for MIMO operation.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-083215, filed Apr. 24, 2019 which is hereby incorporated by reference herein in its entirety.

What is claimed is:

1. A control apparatus operable to control a plurality of access points (APs) configured to be able to use joint beamforming (JB), comprising:
   a memory containing instructions; and
   at least one processor for executing the instructions to cause the control apparatus to:
   obtain, from a station (STA) which is a communication partner, reception information on a received signal strength at the STA of signals transmitted from the plurality of APs; and
   determine, based on the reception information, a communication parameter related to JB for communication with the STA,
   wherein it is determined to use JB for communication with the STA in a case where there is one or more other received signal strengths for which a strength difference from a largest received signal strength among a plurality of received signal strengths of the plurality of APs included in the reception information is within a predetermined range.

2. The control apparatus according to claim 1, wherein the communication parameter includes information on whether to use JB for communication with the STA.

3. The control apparatus according to claim 1, wherein the communication parameter includes information for designating APs to be used for communication using JB with the STA.

4. The control apparatus according to claim 1, wherein prior to obtainment of the reception information by the obtaining unit, the STA has established a communication connection via one AP of the plurality of APs, and the obtaining unit obtains the reception information from the STA via the one AP.

5. The control apparatus according to claim 1, wherein it is determined not to use JB for communication with the STA in a case where the largest received signal strength exceeds a predetermined threshold.

6. The control apparatus according to claim 5, wherein it is determined to use JB for communication with the STA in a case where the largest received signal strength is less than or equal to the predetermined threshold.

7. The control apparatus according to claim 6, wherein the instructions are further executed to
   determine an AP corresponding to the largest received signal strength and one or more APs corresponding to the one or more other received signal strengths as a plurality of APs to be used for communication using JB with the STA.

8. The control apparatus according to claim 7, wherein the instructions are further executed to:
   estimate a transfer function based on channel state information (CSI) between the STA and the plurality of APs to be used for communication using JB with the STA, and notify the estimated transfer function to the plurality of APs to be used for communication using JB with the STA.

9. A method of controlling a control apparatus operable to control a plurality of access points (APs) configured to be able to use joint beamforming (JB), the method comprising:
obtaining, from a station (STA) which is a communication partner, reception information on a received signal strength at the STA of signals transmitted from the plurality of APs; and
determining, based on the reception information, a communication parameter related to JB for communication with the STA,
wherein, it is determined to use JB for communication with the STA in a case where there is one or more other received signal strengths for which a strength difference from a largest received signal strength among a plurality of received signal strengths of the plurality of APs included in the reception information is within a predetermined range.

10. A communication system comprising a plurality of access points (APs) configured to be able to use joint beamforming (JB), a control apparatus for controlling the plurality of APs, and a station (STA), the system comprising:
a memory containing instructions; and
at least one processor for executing the instructions to cause the communication system to:
measure a received signal strength of signals transmitted from the plurality of APs,
transmit reception information relating to the measured received signal strength to the control apparatus,
obtain the reception information from the STA,
determine, based on the reception information, a communication parameter related to JB for communication with the STA, and
set communication with the STA based on a communication parameter received from the control apparatus,
wherein it is determined to use JB for communication with the STA in a case where there is one or more other received signal strengths for which a strength difference from a largest received signal strength among a plurality of received signal strengths of the plurality of APs included in the reception information is within a predetermined range.

11. A non-transitory computer-readable recording medium storing a program making a computer execute a method of controlling a control apparatus to control a plurality of access points (APs) configured to be able to use joint beamforming (JB), the method comprising:
obtaining, from a station (STA) which is a communication partner, reception information on a received signal strength at the STA of signals transmitted from the plurality of APs; and
determining, based on the reception information, a communication parameter related to JB for communication with the STA,
wherein it is determined to use JB for communication with the STA in a case where there is one or more other received signal strengths for which a strength difference from a largest received signal strength among a plurality of received signal strengths of the plurality of APs included in the reception information is within a predetermined range.

\* \* \* \* \*